July 1, 1941.  R. J. BEITEL, JR  2,247,628
OPHTHALMIC LENS
Original Filed Jan. 17, 1938
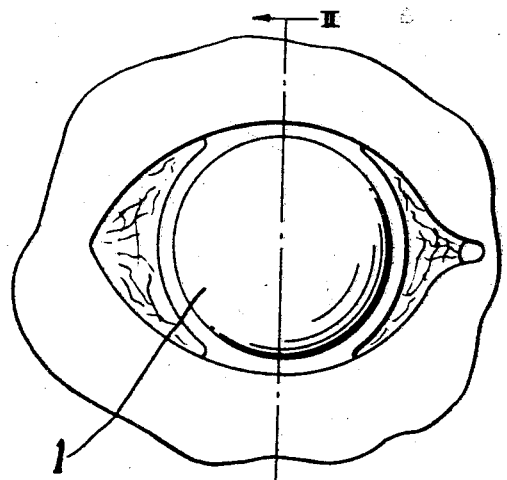
Fig. I
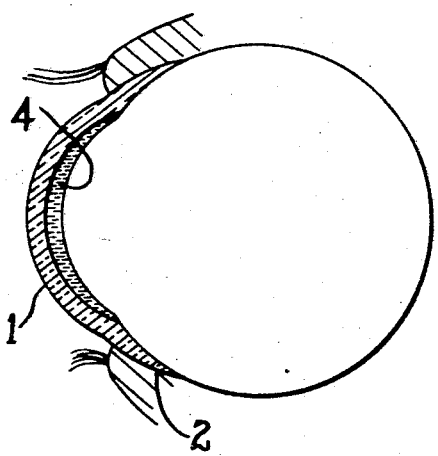
Fig. II
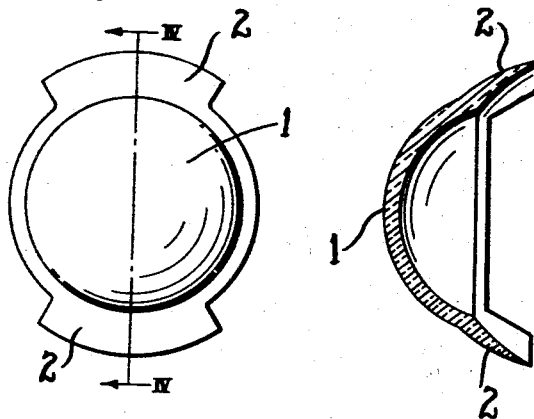
Fig. III
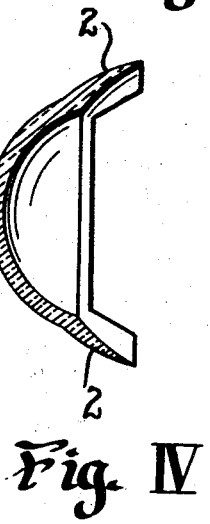
Fig. IV
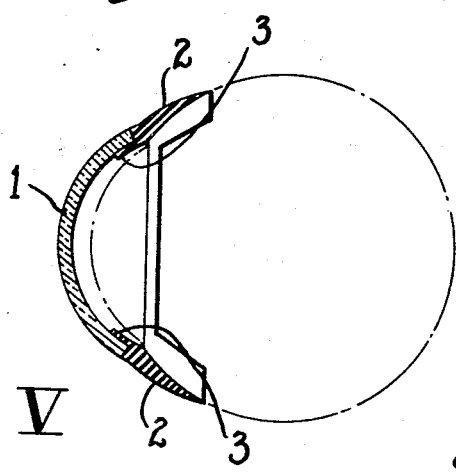
Fig. V
INVENTOR
ROBERT J. BEITEL JR.
BY
Harry H. Styll
ATTORNEY

Patented July 1, 1941

2,247,628

UNITED STATES PATENT OFFICE

2,247,628

OPHTHALMIC LENS

Robert J. Beitel, Jr., Southbridge, Mass., assignor to American Optical Company, Southbridge, Mass., a voluntary association of Massachusetts Application January 17, 1938, Serial No. 185,288
Renewed July 5, 1940

4 Claims. (Cl. 88—54.5)

This invention relates to opthalmic lenses and more particularly to ophthalmic lenses that fit over the eyeball and are held in place over the eye by the eyelids, and to an improved process of fitting said lenses.

One of the principal objects of the invention is to provide a lens of this nature wherein the outer or sclera portion has eye engaging portions only at spaced and separated peripheral locations.

Other objects and advantages of the invention are that they are easy to fit to the eye; that they provide a minimum of material to be trimmed off to fit the eye; that they allow breathing portions to avoid congesting the blood flow and supply of the eye; that one form may fit many different eyes; that they reduce to a minimum the number of different forms that have to be carried in stock; that they facilitate the movement of the eye behind them; that they are more comfortable to the patient because of the reduced bearing surface; that they are easier to fit because of their limited bearing surfaces thus avoiding many irregularities of the curvature of the eye; that they stay in place better; and that they are simple in structure and inexpensive to make and are most economical both in fitting and production operations.

Another object of the invention is to provide an improved process of fitting said lenses to the eye.

Other objects and advantages of the invention will become apparent from the following descriptions taken in connection with the accompanying drawing. It will be apparent that many changes may be made in the details of construction and arrangement of parts and in the steps of the process without departing from the spirit of the invention as expressed in the accompanying claims. I, therefore, do not wish to be limited to the exact details, arrangements and steps shown and described as only the preferred forms have been set forth by way of illustration.

Referring to the drawing:

Fig. I shows a front view of the invention in place over an eye.

Fig. II shows a cross-section on line II—II of Fig. I.

Fig. III shows a front view of one form of the invention removed from the eye.

Fig. IV shows a cross-section on line IV—IV of Fig. III; and,

Fig. V shows a vertical cross-section of the invention positioned before the eye.

It has been found from experience that the most common objection to the so-called contact lenses is the irritation caused to the eye by the contacting surface of the lens. Where the lenses have contacted throughout the inner surface of the sclera portion of the lenses, the lenses have caused a congestion of the blood flow and supply of the eye making the use of the lens for any extended length of time exceedingly painful to the wearer and practically impossible. Again where the sclera portion extended all around the central portion of the lens it was found difficult to get a fit of the inner surface with the eye, and the inner surface of each lens had to be made to fit the curvature of the individual eye. A laborious, difficult and expensive proceeding requiring first measuring the eye and then making the inner surface of the lens to fit. The fitting of an eye was a problem individual to that eye. It is, therefore, an important object of this invention to avoid these difficulties and to provide means whereby many different eyes may be fitted from stock lenses and to provide a method of fitting such lenses to reduce the fitting difficulties and provide facility and economy of fitting not present in prior art constructions and methods.

Referring to the drawing wherein like reference characters designate like parts throughout:—My lens comprises mainly two portions, the iris or central portion 1 and the sclera or outer portion 2. These lenses I preferably make of a synthetic resin of a polymerized compound which is transparent and non-frangible of which there are now several types on the commercial market. Some of these are known commercially as Plexiglas, Lucite, etc. I may also make the sclera portion 2 of a rubber or flexible material with means to hold a central lens portion of either glass, or a synthetic glass or of other desired material.

In my lens I make the sclera portion 2 in separated sectors or portions. I have shown two such portions in my drawing. They, however, may be made with any desirable number of sectors or portions; three, four or more as desired.

The cornea or central portion 1 has a curvature approximately that of the cornea portion of the eye and is fitted to provide a space between the cornea and the inner surface of said portion 1. This space between the surface of the eye and the inner surface of the central portion of the lens 1 is filled with a liquid, such as is now in use in the art, between the eye and the inner surface of a contact lens.

The outer portion 2 is made to fit over the curvature of the sclera of the eye. In Fig. IV the portion 2 is shown integral with the portion 1, while in Fig. V the portion 2 is shown as a separate piece, having means 3 for engaging and holding the edge of the portion 1. This part 2 may be flexible or resilient rubber or other suitable material adapted to rest on the sclera of the eye, and hold the central portion of the lens 1 in place.

The liquid between the iris and the central portion 1 of the lens is indicated at 4 in Fig. II.

It will be noted that the portions 2 for contacting the sclera of the eye are relatively short in extent. It is clear that the larger the number of sectors 2 there are the shorter they will be. This making of the bearing portion 2 of a relatively short extent has many decided advantages in fitting and in comfort to the patient. In fitting the part 2 to the eye there is only a short or limited portion to be trimmed off to accomplish a fit under the lids. There also is only a limited under surface of these portions which has to be fitted to the curvature of the eye. This makes it possible to carry stock lenses adapted to be fitted to many different eyes, which is a decided advantage in dispensing these lenses both to practitioner and patient.

The bearing surface of the parts 2, being limited in extent and separated from the next bearing portion, allows what is termed a breathing space for the eye which prevents congesting and cutting off the blood flow and supply.

It is clear that it is comparatively easy to fit these sectored lenses to the eye by trimming off the limited extent of edge or sides or surfaces as required by the individual eye. It also makes the insertion of the liquid 4 more easy and direct.

The portions 2 can be made in various shapes as they are not confined to any one particular shape or size.

Another advantage of the separated contact portions 2 lies in the fact that the contact with the eye has been limited in extent, so that if there are any irregularities of curvature of the eyeball especially in the end sections contact with these portions is avoided. The eye is easier to fit because it is fitted only on limited portions and irregularities of other portions do not cause complications as in the case where the bearing is all around.

Another great advantage of my lens lies in the fact that it facilitates the movement of the eye under the lens. Where the contact surface is all around, as in the case of prior art lenses, the contact surface was more extended. This gave a tendency for the lens to stick to the eye and move with it. Then when the lens struck the edge of the eye it stuck and the eye moved away from it. This caused pain and confusion to the patient. In my lens the contact surface is limited and the eye is freer to move behind the lens without displacing it and there are no portions to stick at the ends of the eye.

Where the portion 2 is of rubber and also of a plastic synthetic glass the ends may be cut off with scissors or a like instrument, where harder substances are used they may be ground off.

By my method it is clear that the fitting of both edge and bearing surfaces are facilitated. The limited bearing surface tends for the patient's comfort, the movement of the eye is facilitated behind the lens and many patients may be fitted with stock lenses supplied the fitter by the manufacturer. Such lenses are an improvement both to the fitter and the patient. They are also more economical than the prior art forms.

From the foregoing it will be seen that I have provided simple, efficient and economical means for carrying out and obtaining all the objects and advantages of the invention.

Having described my invention, I claim:

1. In a contact type ophthalmic lens, a main lens portion and a plurality of scleral portions on said main lens portion in the vicinity of the top and bottom edges thereof and extending outwardly of said edge portions an amount less than the diameter of the main lens portion with end edges substantially concentric with the adjacent edge of the main lens portion and shaped to fit beneath the upper and lower lids of the eye with the outwardly extending portions confined within the limits of the central areas of said upper and lower lids when in position of use on the eye and having portions cut away at the sides of the lens structure between the upper and lower scleral portions and provided with edge contours substantially concentric with the adjacent edges of said main lens portion whereby free and easy lateral movement of an eye wearing said lens may be accomplished.

2. In a contact type ophthalmic lens, a central main lens portion, and scleral portions on said main lens portion substantially centrally of the top and bottom portions thereof and extending radially in diametrically opposed directions vertically of said main lens portion, said scleral portions extending peripherally of the upper and lower edge portions of said main lens portion to points which are substantially equidistant from the vertical center line of the main lens portion with the radial extent of said scleral portions being substantially less than the peripheral extent thereof, the side portions of the lens structure between the said upper and lower scleral portions being cut away for clearance whereby free and easy lateral movement of an eye wearing said lens may be accomplished.

3. In a contact type ophthalmic lens a main lens portion and a supporting portion secured to the main lens portion adjacent the peripheral edge thereof, said supporting portion having an edge adapted to engage the edge of the main lens portion and having an adjacent flange-like portion adapted to overlie the inner surface of the main lens portion adjacent the contour edge of said lens portion with the remainder of the inner surface of said supporting portion shaped to engage the scleral portion of the eye, said main supporting portion having parts extending outwardly in the vicinity of the top and bottom edges thereof an amount less than the diameter of the main lens portion and shaped to fit beneath the upper and lower lids of the eye with the outwardly extending portions confined within the limits of the central areas of said upper and lower lids when in position of use on the eye and with the side portions of the lens structure cut away for clearance whereby free and easy lateral movement of an eye wearing said lens may be accomplished.

4. In a contact type ophthalmic lens, a main lens portion having a finished optical surface on at least one side thereof to control in part the optical characteristics desired through said main lens portion when in position of use on the eye and scleral portions on said main lens portion in the vicinity of the top and bottom edges thereof and extending radially in diametrically opposed directions vertically of said main lens portion, said scleral portions extending peripherally of the upper and lower portions of said main lens portion with the radial extent of said scleral portions being less than the greatest dimension of the peripheral extent thereof, the side portions of the lens structure between the upper and lower scleral portions being cut away for clearance whereby free and easy lateral movement of an eye wearing said lens may be accomplished.

ROBERT J. BEITEL, JR.